3,193,601
RECOVERY OF RESIN SCRAP
John George Selby Billingsley, Newark, Del., assignor to E. I. du Pont de Nemours and Company, Wilmington, Del., a corporation of Delaware
Filed Aug. 1, 1962, Ser. No. 213,996
3 Claims. (Cl. 264—142)

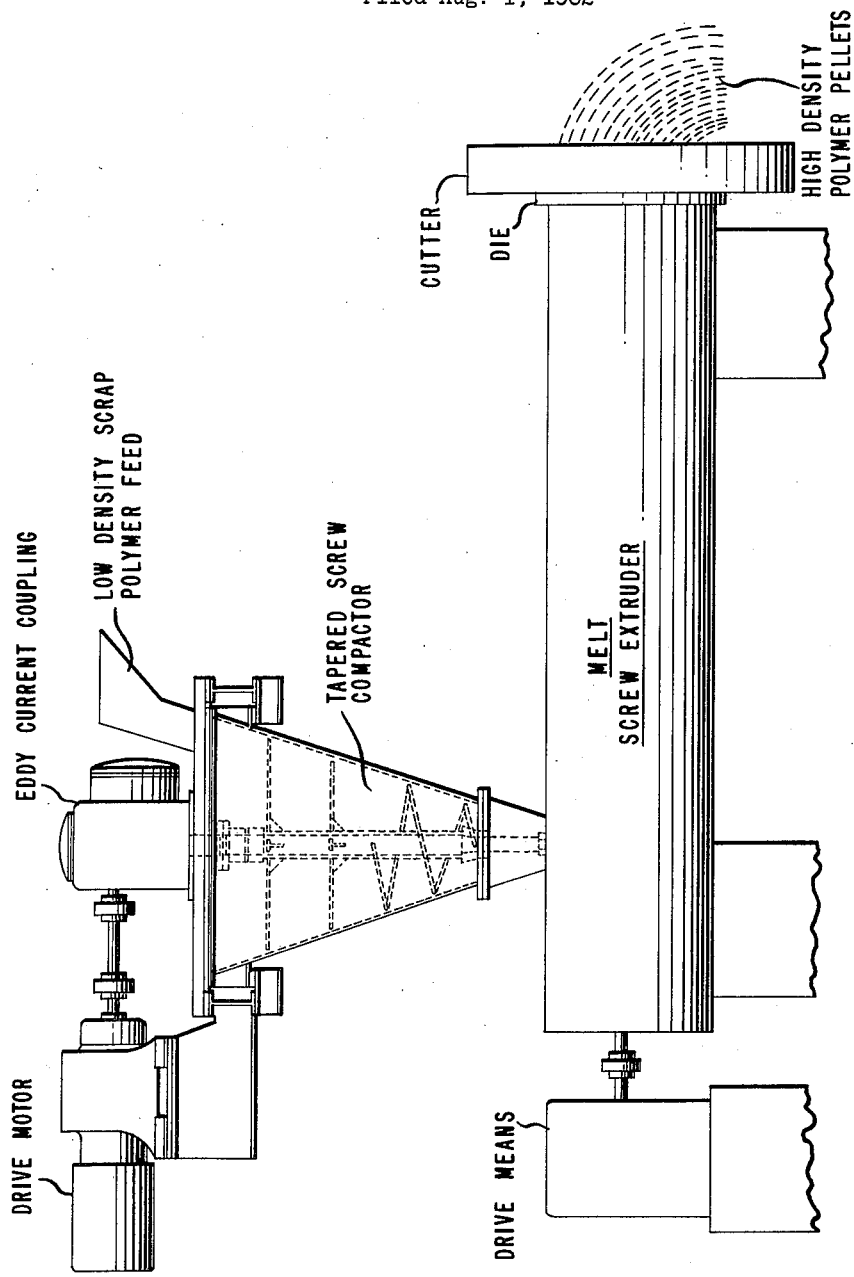

This invention relates to the reclamation of thermoplastic resin scrap, and more particularly to the reclamation of scrap film, fibers, etc., of thermoplastic resin for reuse in the production of shaped structures of said thermoplastic resin.

In the commercial manufacture of extruded shaped structures such as films and fibers, as well as molded objects from thermoplastic resins, a substantial amount of scrap thermoplastic resin material is produced. In order to effect acceptable economies in manufacture, it is necessary to convert the scrap or waste material to a form that can be reused in the process. For many purposes it is desirable to convert the waste material into discrete particles of uniform size and uniform bulk density which are suitable for feeding into extruders, molding machines and the like. In the case of film-extruding operations or fiber-forming operations, it is essential that the material being fed into the extruder be of uniform size and have a uniform bulk density so that films and fibers of uniform properties can be obtained.

In the production of thermoplastic films, a common practice is to cut up the scrap film materials into the form of small platelets as the first step in reclamation. However, it is found in attempting to feed this material into a conventional type plasticating extruder that difficulties are encountered with uneven feed of the material and consequently a non-uniform extrudate is obtained. Various types of straight screw compacting and extruding arrangements have been investigated but here again, difficulties in feeding and in controlling degree of compaction are encountered and a compacted extrudate of uniform bulk density is not realized.

Accordingly, it is an object of this invention to provide a process for converting a mass of particulate material of relatively low bulk density derived from shaped structures of thermoplastic resins into a mass of higher bulk density which is uniform in bulk density and suitable for use in subsequent structure-shaping operations.

Another object of this invention is to provide an efficient and economical process for converting a mass of scrap film and like structures of thermoplastic resin into a mass of discrete particles having a higher, and uniform bulk density and suitable for use in the production of films, filaments and other shaped articles of said thermoplastic resin. The foregoing and related objects will more clearly appear from the description which follows.

These objects are realized in full by the present invention which, briefly stated, comprises, in combination, the steps of (1) continuously passing a composite mass of variable low bulk density, comprising essentially particulate thermoplastic resin, through a tapered screw compactor, said compactor being driven through a preselected controlled torque to place the compacted mass of particulate thermoplastic resin issuing from said compactor under a constant pressure within the range of from 75 pounds per square inch (p.s.i.) to just below the pressure at which said compacted material would be converted into melt form, (2) continuously advancing said compacted material issuing under said constant pressure from said compactor directly into an extruder, (3) heating said mass in said extruder to a temperature effective to convert the thermoplastic resin to the molten state, and (4) thereafter continuously extruding the molten resin through extrusion dies. Preferably the extrudate is subsequently cut into particles or pellets of uniform dimension, the mass of said pellets having a uniform bulk density substantially higher than the bulk density of the mass of particulate thermoplastic resin material fed to the compactor.

A wide variety of materials can be conditioned for reclamation by the process of this invention. Thus, thermoplastic materials such as polyolefins, polyesters, polyamides and polyethers in the form of films, fibers, powders, blocks or chips lend themselves readily to compaction and extrusion to a higher bulk density particulate material. Further, non-thermoplastic materials such as asbestos, hemp and various inorganic fillers can be incorporated with thermoplastic materials and carried through the process of this invention to provide particulate material well suited for thermoforming operations such as extrusion into films, sheets, fibers, as well as molding into gross shapes.

The arrangement of equipment for converting the particulate thermoplastic resin into pellet form having uniform bulk density is shown schematically by way of example, in the accompanying drawing. Depending on the degree of compaction desired within the compactor, the compactor screw can be of constant pitch, increasing pitch, or decreasing pitch, and it can be of single or multiple flight design. For best operation of the compactor, particularly for very light or fluffy materials, the surfaces of the compactor should be smooth (i.e., unbroken) and the interwall of the compactor shell should be roughened so as to minimize the tendency of the material being compressed to rotate in the compactor. In a typical operation, scrap polymer, e.g., scrap polyethylene film, is cut into flakes having a maximum dimension of ½ inch or smaller by any suitable means (not shown). At this stage, using scrap polyethylene film, the bulk density of the flake material is of the order of 4 pounds per cubic foot. The flake material is then fed into a tapered screw compactor, the screw of which is driven through a Dynamatic [1] eddy current or like coupling so as to apply a controlled amount of torque to the tapered screw. The tapered screw compresses the flake at a constant pressure up to a pressure in the order of 150 p.s.i., and forces the compacted material directly into the feed throat of a melt extruder provided with a filament extrusion die plate. The compacted material is extruded at a temperature in the range of 150° C. to 250° C. through the die plate and the extruded strands are converted into pellet form by means of a conventional cutter positioned directly adjacent to the die. The output of pelleted material has a bulk density which varies less than two pounds per cubic foot; the average bulk density is 30 pounds per cubic foot. The output of the arrangement just described reached 1800 pounds per hour. The same extruder operating in a standard manner on polyethylene flake that had not been compacted had a capacity of approximately 900 pounds per hour.

For materials such as most polyethylene film it is preferred to operate the compactor at pressures between 100 and 200 p.s.i. although it is possible to operate at somewhat lower pressure (about 75 p.s.i.) and also at higher pressures (about 250 p.s.i.). At the higher pressures (above 225 p.s.i.), there is a tendency for some materials to jam the equipment; at pressures below about 75 p.s.i. the feed to the extruder becomes non-uniform, and the desired high throughput is not realized. An important consideration is that the degree of compaction should not be to the degree that a melt is produced in the compactor. The most suitable range of pressures for a given thermoplastic material can be readily determined.

Temperature of extrusion is not especially critical.

---
[1] Dynamatic Instrument Division—American Brake Shoe Co.

Temperatures between 175° C. and 255° C. give very satisfactory operation but it is possible to operate at temperatures not much above the softening point of the resin (135° C. for polyethylene, for example) and at higher temperatures (280° C.). In general, operating at the excessively higher temperatures is avoided in order to preclude degradation of the resin.

With respect to bulk density of the reclaimed material, the essential requirement is that it be uniform. Desired average bulk density will depend considerably upon the nature of the material being reclaimed. For polyethylene film reclamation, a bulk density of the final pelleted material in the order of 25 to 35 pounds per cubic foot is preferred; bulk densities of around 15–20 up to about 50 pounds per cubic foot can be used.

In a preferred embodiment of this invention a thermoplastic resin such as polyethylene in the form of a film is cut into small pieces less than ¼ inch in each direction and is then fed into the tapered screw compactor which is driven through an eddy current coupling of conventional design to provide a controlled torque for delivery of a controlled compaction pressure by the tapered screw (100–200 p.s.i.). The compacted mass is fed directly into the feed throat to a melt extruder and the molten polymer is forced through a perforated die plate. The resulting strands of extruded material are cut into small pieces of equal length immediately adjacent the die plate. The pelleted material from this resin has a bulk density in the range of 25–35 pounds per cubic foot.

The principal advantage of this invention is that it provides a means for efficient reclamation of plastic materials in a form suitable for use in subsequent structure-shaping operations such as extrusion into films or fibers or molding operations wherein uniformity of product is essential. Furthermore, by use of this system substantial economies in the manufacture of thermoplastic shaped structures can be attained, through efficient reclamation of material and lower captial investment due to the high capacity of the unit operations.

I claim:

1. A process which comprises, in combination, the steps of continuously compacting a continuous stream of particulate thermoplastic resin of non-uniform bulk density in a taper screw compactor driven through a controlled torque controlled to place said particulate resin issuing form said compactor under a constant pressure within the range of from 75 pounds per square inch to just below the pressure at which said compacted resin would be converted to melt form; continuously melting the compacted resin in a melt extruder, and continuously extruding molten resin from said extruder.

2. The process of claim 1 wherein the molten resin is continuously extruded in the form of continuous filament and said filament is converted to pellet form.

3. A process which comprises in combination the steps of continuously passing a mass comprised essentially of polyethylene in particulate form having a non-uniform bulk density of about four pounds per cubic foot through a tapered screw compactor driven through a controlled torque controlled to place the compacted mass issuing from said compactor at a uniform pressure within the range of from 100 to 200 pounds per square inch, (2) continuously advancing said compacted mass issuing from said compactor under uniform pressure directly into an extruder, heating said mass in said extruder to convert said particulate polyethylene into molten polyethylene, (4) extruding said molten polyethylene in the form of continuous filament, and (5) thereafter converting said filament to uniformly sized pellets having a substantially uniform bulk density in the range of 25 to 35 pounds per cubic foot.

References Cited by the Examiner

UNITED STATES PATENTS

| | | | |
|---|---|---|---|
| 541,642 | 6/95 | Traiser | 18—12 XR |
| 1,156,096 | 10/15 | Price | 18—12 XR |
| 2,262,989 | 11/41 | Conklin | 18—12 XR |
| 2,436,201 | 2/48 | Cole | 264—176 |
| 3,025,564 | 3/62 | Voight | 264—142 |

ROBERT F. WHITE, *Primary Examiner.*

ALEXANDER H. BRODMERKEL, *Examiner.*